United States Patent
Brown

(10) Patent No.: US 10,477,836 B1
(45) Date of Patent: Nov. 19, 2019

(54) DEVICE FOR STABILIZING A TAIL AND PREVENTING AN ANIMAL FROM LICKING OR BITING ITS TAIL

(71) Applicant: Janice Marie Brown, Los Angeles, CA (US)

(72) Inventor: Janice Marie Brown, Los Angeles, CA (US)

(*) Notice: Subject to any disclaimer, the term of this patent is extended or adjusted under 35 U.S.C. 154(b) by 186 days.

(21) Appl. No.: 15/806,106

(22) Filed: Nov. 7, 2017

Related U.S. Application Data

(60) Provisional application No. 62/419,020, filed on Nov. 8, 2016.

(51) Int. Cl.
  *B68B 5/04* (2006.01)
  *A01K 13/00* (2006.01)
  *A01K 27/00* (2006.01)

(52) U.S. Cl.
  CPC .......... *A01K 13/005* (2013.01); *A01K 27/002* (2013.01); *B68B 5/04* (2013.01)

(58) Field of Classification Search
  CPC .... B68B 5/04; B68B 3/16; B68B 5/00; B68B 7/00; A01K 13/006; A01K 13/005; A01K 23/00; A01K 15/02; A01K 27/002
  USPC ....... 119/850, 811, 868, 809, 858; 54/78, 22
  See application file for complete search history.

(56) References Cited

U.S. PATENT DOCUMENTS

| | | | | |
|---|---|---|---|---|
| 148,367 A | * | 3/1874 | Howard | B68B 5/04 54/78 |
| 1,343,147 A | * | 6/1920 | Liechty | B68B 5/00 54/78 |
| 1,991,299 A | * | 2/1935 | Swaggerty | B68B 5/04 54/22 |
| 2,150,526 A | * | 3/1939 | Swaggerty | B68B 3/16 54/78 |
| 2,508,117 A | * | 5/1950 | Lavery, Sr. | B68B 5/04 54/78 |
| 2,740,380 A | * | 4/1956 | Johnson | A01K 13/005 119/811 |
| 3,534,527 A | * | 10/1970 | Miller | B68B 5/04 54/22 |
| 4,141,197 A | * | 2/1979 | Nichols | B68B 7/00 54/1 |
| 6,334,409 B1 | * | 1/2002 | Stein | A01K 15/02 119/811 |
| 6,408,603 B1 | * | 6/2002 | Babuik | B68B 5/04 54/22 |
| 6,481,383 B1 | * | 11/2002 | Ross | A01K 13/006 119/850 |

(Continued)

*Primary Examiner* — Yvonne R Abbott-Lewis
(74) *Attorney, Agent, or Firm* — Plager Schack LLP

(57) ABSTRACT

A device for stabilizing an animal's tail and preventing the animal from licking and biting the tail may include a collar designed to encircle the animal's neck; a belly strap attached to the collar and designed to be positioned along an underside of the animal's stomach; a spine strap attached to the collar and designed to be positioned along the animal's spine; a chest strap attached to both the belly strap and the spine strap, the chest strap sized to encircle the animal's ribcage; a waist strap attached to both the belly strap and the spine strap, the waist strap sized to encircle the animal proximate to the animal's waist; and a rear pad with a tail sleeve extending outwardly therefrom, the tail sleeve sized to accommodate the animal's tail, wherein the rear pad is attached to the spine strap and the waist strap.

9 Claims, 2 Drawing Sheets

(56) References Cited

U.S. PATENT DOCUMENTS

| | | | |
|---|---|---|---|
| 9,688,526 B2 * | 6/2017 | St. Louis | B68B 3/16 |
| 2015/0156987 A1 * | 6/2015 | Baynes | A01K 13/006 |
| | | | 119/850 |
| 2015/0189859 A1 * | 7/2015 | John | A01K 23/00 |
| | | | 119/868 |
| 2018/0020642 A1 * | 1/2018 | Nicolas | A01K 23/00 |
| | | | 119/868 |
| 2018/0359993 A1 * | 12/2018 | Julie | A01K 13/005 |

* cited by examiner

US 10,477,836 B1

DEVICE FOR STABILIZING A TAIL AND PREVENTING AN ANIMAL FROM LICKING OR BITING ITS TAIL

RELATED APPLICATION

This application claims priority to provisional patent application U.S. Ser. No. 62/419,020 filed on Nov. 8, 2016, the entire contents of which is herein incorporated by reference.

BACKGROUND

The embodiments herein relate generally to pet accessories, and more particularly, to a device for stabilizing an animal's tail while simultaneously preventing the animal from licking or biting its tail.

Some animals will incessantly lick or bite their tails until the tail is raw. Conventionally, an owner may attempt to prevent the licking and biting using a tail wrap. However, most animal can pull apart the tape and other material that is wrapped around their tail.

Additionally, when an animal injures its tail, it may need to be stabilized. However, no suitable device exists for stabilizing an animal's tail.

Therefore, what is need is a device designed to stabilize an animal's tail, while simultaneously preventing the animal from licking or biting its tail

SUMMARY

Some embodiments of the present disclosure include a device for stabilizing an animal's tail and preventing the animal from licking and biting the tail. The device may include a collar designed to encircle the animal's neck; a belly strap attached to the collar and designed to be positioned along an underside of the animal's stomach; a spine strap attached to the collar and designed to be positioned along the animal's spine; a chest strap attached to both the belly strap and the spine strap, the chest strap sized to encircle the animal's ribcage; a waist strap attached to both the belly strap and the spine strap, the waist strap sized to encircle the animal proximate to the animal's waist; and a rear pad with a tail sleeve extending outwardly therefrom, the tail sleeve sized to accommodate the animal's tail, wherein the rear pad is attached to the spine strap and the waist strap.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to stabilize an animal's tail and/or prevent the animal from licking or biting its tail and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.
   a. Collar
   b. Belly Strap
   c. Spine Strap
   d. Chest Strap
   e. Waist Strap
   f. Rear Pad
   g. Tail Sleeve
   h. Various Connectors The various elements of the device of the present disclosure may be related in the following exemplary fashion. It is not intended to limit the scope or nature of the relationships between the various elements and the following examples are presented as illustrative examples only.

Figure 1:
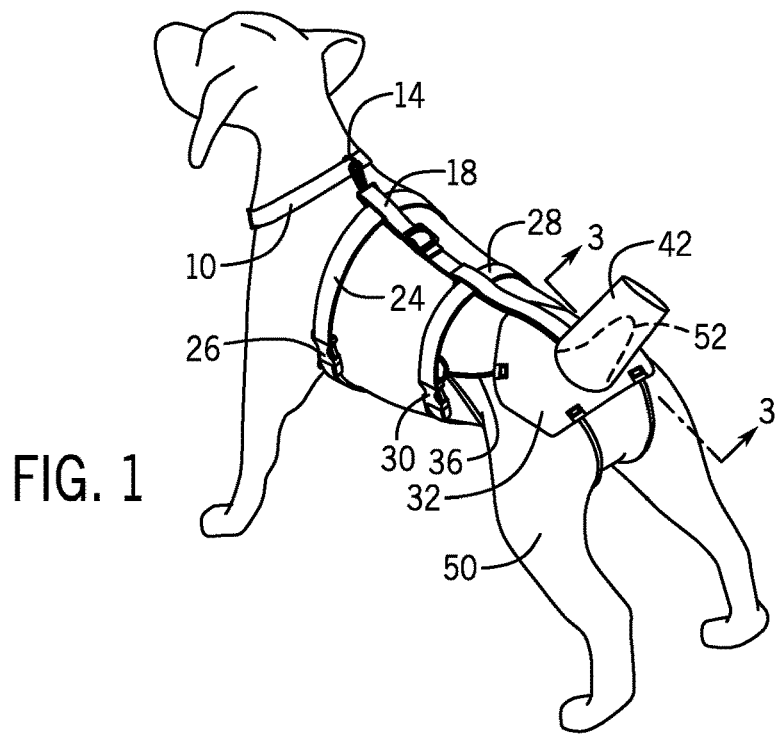
FIG. 1 is a rear perspective view of one embodiment of the present disclosure.
Figure 2:
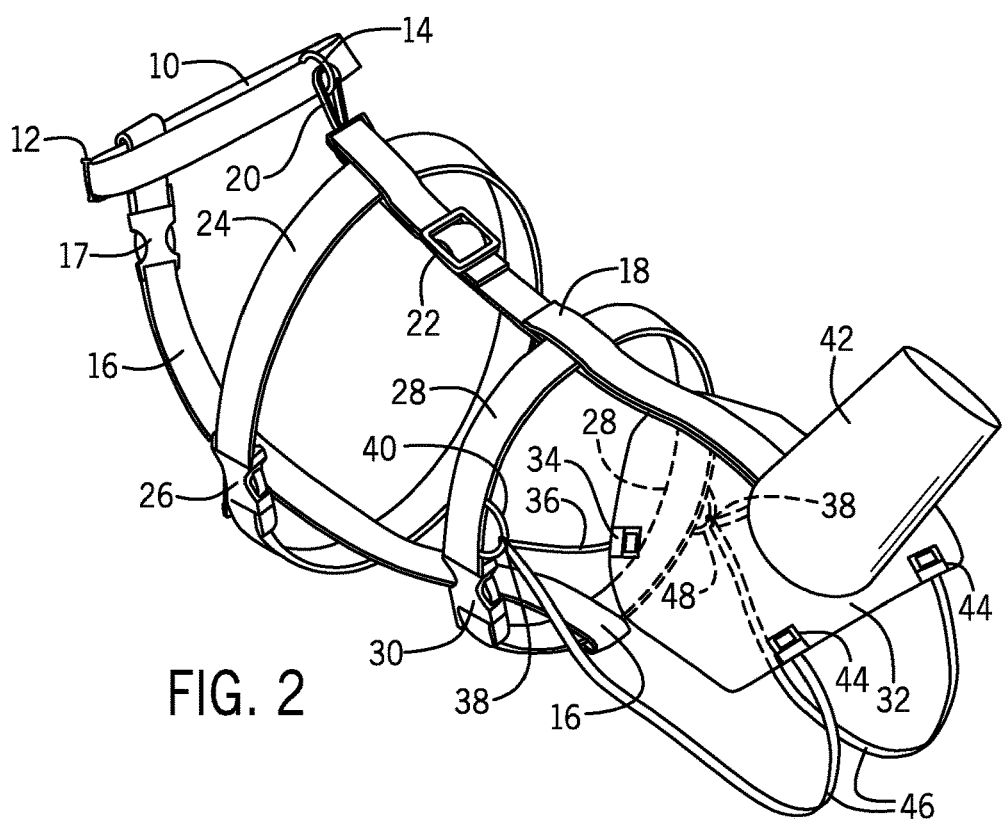
FIG. 2 is a rear perspective view of one embodiment of the present disclosure.
Figure 3:
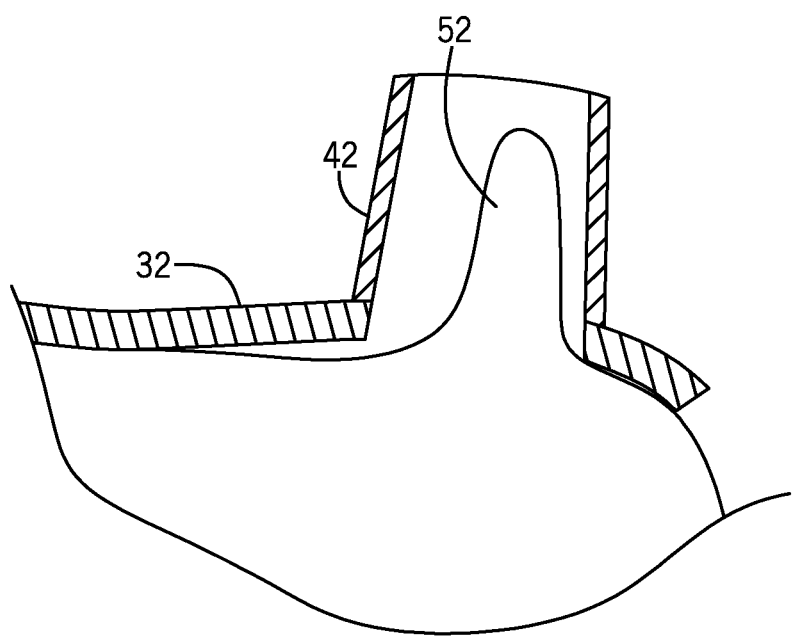
FIG. 3 is a cross-sectional view of one embodiment of the present disclosure, taken along line 3-3 in FIG. 1.

By way of example, and referring to FIGS. 1-3, some embodiments of the present disclosure include a device for stabilizing an animal's tail 52 and preventing the animal 50 from licking and biting the tail 52, the device comprising a collar 10 designed to encircle the animal's neck; a belly strap 16 attached to the collar 10 and positioned along an underside of the animal's stomach; a spine strap 18 attached to the collar 10 and positioned along the animal's spine; a chest strap 24 attached to both the belly strap 16 and the spine strap 18, the chest strap 24 sized to encircle the animal's ribcage; a waist strap 28 attached to both the belly strap 16 and the spine strap 18, the waist strap sized to encircle the animal proximate to its waist; and a rear pad 32 with a tail sleeve 42 extending outwardly therefrom, the tail sleeve 42 sized to accommodate the animal's tail 52, wherein the rear pad 32 is attached to the spine strap 18 and the waist strap 28. The straps may be attached to each other using any suitable connectors. In embodiments, the straps may all be adjustable such that the device accommodates animals of varying sizes.

In some embodiments, the collar 10 includes a collar clip 12, such that the collar 10 may be easily removed from the animal. For example, the collar clip 12 may be a conventional side release buckle. The collar 10 may also include a collar ring 14 attached thereto.

As described above, the belly strap 16 may be attached to each of the collar 10, the chest strap 24, and the waist strap 28. For example, a first end and a second end of the belly strap 16 may each comprise a loop, wherein the collar 10 may be threaded through the loop on the first end, connecting the collar 10 to the belly strap 16; and the waist strap 28 may be threaded through the loop on the second end, connecting the collar 10 to the belly strap 16. The chest strap 24 may be permanently attached to the belly strap 16, such as by sewing the chest strap 24 to the belly strap 16. Additionally, the belly strap 16 may include a belly strap clip 17, such as a conventional side release buckle, such that the belly strap 16 can be fastened under the animal's stomach/chest.

As described above, the spine strap 18 may be attached to each of the collar 10, the chest strap 24, the waist strap 28, and the rear pad 32. For example, in some embodiments the spine strap 18 may have a first loop at a first end thereof and a second loop in a central portion thereof, wherein the chest strap 24 may be threaded through the first loop to attach the chest strap 24 to the spine strap 18; and the waist strap 28 may be threaded through the second loop to attach the waist strap 28 to the spine strap 18. The first end of the spine strap 18 may also have a spine strap clip 20 attached thereto, wherein the spine strap clip 20 is designed to engage with the collar ring 14 to removably attach the spine strap 18. A second end of the spine strap 18 may be attached to the rear pad 32 and tail sleeve 42. In some embodiments, the spine strap 18 may be sewn to the rear pad 32 and tail sleeve 42. As shown in the Figures, the spine strap 18 may include a slider buckle 22, wherein the slider buckle 22 may be used to adjust the length of the spine strap 18 and, thus, the size of the device.

As shown in the Figures, the chest strap 24 may include a chest strap clip 26, such as a conventional side release buckle, such that the chest strap 24 can be fastened around the animal's chest.

Similar to the chest strap 24, the waist strap 28 may include a waist strap clip 30, such as a conventional side release buckle, such that the waist strap 28 can be fastened around the animal's body proximate to its waist. The waist strap 28 may also include a plurality of waist strap loops 40, 48 attached thereto. In some embodiments, the waist strap 28 includes two waist strap loops 40, 48 attached thereto.

The rear pad 32 may have a plurality of pad attachments attached thereto. For example, the rear pad 32 may include two forward pad attachments 34 and two aft pad attachments 44, wherein the forward pad attachments 34 are positioned proximate to the animal's waist, and the aft pad attachments 44 are positioned proximate to the animal's buttocks. Each of the forward pad attachments 34 and the aft pad attachments 44 may have a bungee extending therefrom. For example, the forward pad attachments 34 may each have a forward portion 36 of a bungee extending therefrom, while the aft pad attachments 44 may have an aft portion 46 of the bungee extending therefrom. Wherein the forward portion 36 and the aft portion 46 together make a single bungee that extends from the forward pad attachment 34 through the waist strap loop 40 or 48 on the waist strap 28 and to the aft pad attachment 44. Thus, the bungee may extend from the rear pad 32 to the waist loop 40 or 48, under the leg of the animal, and to an aft region of the rear pad 32.

The tail sleeve 42 may extend outward from the rear pad 32 at an angle, and the tail sleeve 42 may be sized to accommodate an animal's tail 52. In some embodiments, the tail sleeve 42 may be substantially conical shaped.

The device of the present disclosure may be used by placing the collar 10 around the animal's neck, running the belly strap along the animal's stomach, attaching the spine strap 18 to the collar 10 and running the spine strap 18 down the animal's back, securing the chest strap 24 around the animal's chest, securing the waist strap 28 around the animal proximate to its waist, placing the tail sleeve 42 over the animal's tail 52, and looping the bungees under the animal's rear legs. The device may be tightened or loosened as needed.

The device of the present disclosure may be made using any desired materials.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A device for stabilizing an animal's tail and preventing the animal from licking and biting the tail, the device comprising:
    a collar designed to encircle the animal's neck;
    a belly strap attached to the collar and designed to be positioned along an underside of the animal's stomach;
    a spine strap attached to the collar and designed to be positioned along the animal's spine;
    a chest strap attached to both the belly strap and the spine strap, the chest strap sized to encircle the animal's ribcage;
    a waist strap attached to both the belly strap and the spine strap, the waist strap sized to encircle the animal proximate to the animal's waist; and
    a rear pad with a tail sleeve extending outwardly therefrom, the tail sleeve sized to accommodate the animal's tail,
    wherein the rear pad is attached to the spine strap and the waist strap.

2. The device of claim 1, wherein:
    the belly strap comprises a first end loop and a second end loop;
    the collar is threaded through the first end loop;
    the waist strap is threaded through the second end loop; and
    the chest strap is attached to the belly strap between the first end loop and the second end loop.

3. The device of claim 1, wherein:
    the spine strap comprises a first loop at a first end thereof and a second loop in a central portion thereof;
    the chest strap is threaded through the first loop, attaching the chest strap to the spine strap; and
    the waist strap is threaded through the second loop, attaching the waist strap to the spine strap.

4. The device of claim 3, further comprising:
    a spine strap clip attached to the first end of the spine strap; and
    a collar ring attached to the collar,
    wherein the spine strap clip is designed to engage with the collar ring to removably attach the spine strap to the collar.

5. The device of claim 1, further comprising at least two waist strap loops attached to the waist strap.

6. The device of claim 5, wherein:
    the rear pad comprises a plurality of pad attachments attached thereto; and
    the pad attachments are attached to the waist strap loops with a bungee.

7. The device of claim 6, wherein the rear pad comprises two forward pad attachments and two aft pad attachments.

8. The device of claim 7, wherein a bungee extends from a first forward pad attachment of the two forward pad attachments through a first of the at least two waist strap loops and to a first aft pad attachment of the two aft pad attachments.

9. The device of claim 1, wherein each of the collar, the belly strap, the spine strap, the waist strap, and the chest strap are adjustable in length.

* * * * *